United States Patent
Fullmer et al.

(10) Patent No.: US 7,399,034 B2
(45) Date of Patent: Jul. 15, 2008

(54) TIME-OUT SEAT WITH CHANGEABLE AUDIO SIGNAL

(76) Inventors: Kathy F. Fullmer, 9482 S. 220 East, Sandy, UT (US) 84070; Debra S. Stewart, 9485 S. 220 East, Sandy, UT (US) 84070

( * ) Notice: Subject to any disclaimer, the term of this patent is extended or adjusted under 35 U.S.C. 154(b) by 0 days.

(21) Appl. No.: 11/580,606

(22) Filed: Oct. 13, 2006

(65) Prior Publication Data

US 2008/0100108 A1    May 1, 2008

(51) Int. Cl.
A47C 7/62    (2006.01)
A47C 7/72    (2006.01)

(52) U.S. Cl. .................... 297/217.3; 297/217.4
(58) Field of Classification Search .............. 297/217.3, 297/217.4
See application file for complete search history.

(56) References Cited

U.S. PATENT DOCUMENTS

| | | | |
|---|---|---|---|
| 4,538,142 A | 8/1985 | Hamilton et al. | |
| 4,780,706 A | 10/1988 | Bollag | |
| 5,044,961 A | 9/1991 | Bruskewitz | |
| 5,122,994 A | 6/1992 | Benedetti | |
| 5,369,820 A | 12/1994 | Blount | |
| 5,384,917 A | 1/1995 | Epling | |
| 5,682,137 A | 10/1997 | Li | |
| 5,683,137 A | 11/1997 | McDonald et al. | |
| 5,684,758 A | 11/1997 | Gray et al. | |
| 5,697,790 A | 12/1997 | Garland et al. | |
| 5,720,519 A * | 2/1998 | Barnes ................ | 297/217.4 X |
| 5,931,534 A | 8/1999 | Hutter | |
| 5,938,281 A * | 8/1999 | Keils ................... | 297/217.4 X |
| 6,589,058 B2 * | 7/2003 | Brooks ................ | 434/365 |
| 7,039,207 B1 * | 5/2006 | Elrod et al. ........... | 297/217.4 X |
| 2004/0110115 A1 | 6/2004 | Carvajal | |

* cited by examiner

Primary Examiner—Rodney B. White
(74) Attorney, Agent, or Firm—Clayton, Howarth & Cannon, P.C.

(57) ABSTRACT

This invention is a time-out chair that allows a child's caregiver to leave the room where the child is taking the time-out, and yet still ensure that the child is staying in the time-out. The chair contains a sensor, such as an infrared sensor or force sensor, which detects when the child has left. The sensor communicates to a microcomputer, which emits an audio and/or visual signal to the child. The audio signal can be selected from several built in signals, recorded or inputted by the caregiver. The microcomputer also may transmit a signal to a remote unit that the caregiver can carry out of the room so that the caregiver is advised that the child has left the time-out. The microcomputer also keeps track of the time remaining in the time-out, and advises the child and/or the caregiver when the time-out is over.

20 Claims, 5 Drawing Sheets

TIME-OUT SEAT WITH CHANGEABLE AUDIO SIGNAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the field of child discipline, and more particularly, to a seat used to administer a form of discipline known as a "time-out." The time-out is a method commonly used to discipline a child, in which a child is directed to sit for a period of time in a specified place, away from friends, toys, and other distractions.

BRIEF SUMMARY OF THE INVENTION

An illustrative embodiment of the present invention comprises a seat for a child, a mechanism for detecting that the child has left the seat, and a mechanism for notifying the child and the caregiver that the child has left the seat and that the time-out period has ended. The audio indicators that the child has left the seat are changeable by the caregiver administering the discipline. Some embodiments of the present invention also comprise a mechanism for timing the discipline period, together with an audio indicator that the period is over, which is also changeable by the caregiver.

In one illustrative embodiment, the device for detecting that the child has left the seat comprises a pressure sensor in the seat, which detects that the child is not longer sitting on the seat. In another illustrative embodiment, the device for detecting that the child has left the seat comprises an infrared detector connected to the seat or located in the seat that detects when the child is no longer near the sensor. In another illustrative embodiment, the device for detecting that the child has left the seat comprises a tether, which is attached to the child or the child's clothing, the other end of the tether being connected to a force sensor that detects when the child moves away from the chair and pulls on the tether. Alternatively, when the child moves away from the chair, an electrical circuit is completed, which results in an alarm being given.

In some of these embodiments, the sensor is connected to a microcomputer. When the sensor detects that the child is attempting to leave the time-out chair, the microcomputer sounds a predetermined audio warning at the location of the time-out seat. This audio warning can be changed by the caregiver. A transmitter is also connected to the microcomputer, which can send a signal to a remote unit that is located with the caregiver. The remote unit also emits an audio or visual signal that the child has left the time-out seat.

The microcomputer is also equipped with a timer that can be set by the caregiver. A changeable audio signal is activated by the microcomputer at the time-out seat when the time-out period is over. The microcomputer can also transmit a signal to the remote unit to indicate to the caregiver that the time-out is over, or to indicate the time remaining in the time-out period. The audio signal may be changed by the caregiver. The signals that the caregiver can choose from may come from one of the following sources, or other sources: they may be built in, they may be recorded by the caregiver at the chair with a built-in microphone, or they may be inputted from an external source, like, for example, a portable audio player. A memory unit in the microcomputer is capable of storing various audio signals. The caregiver can select from among these and change between them or add new signals.

In other illustrative embodiments of the present invention, the detection device is connected directly to an audio device. An audio message can be recorded or loaded onto the audio device. The signal from the detection device causes the audio device to play the message.

DETAILED DESCRIPTION

Before the present time-out seat and methods are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

Figure 1:
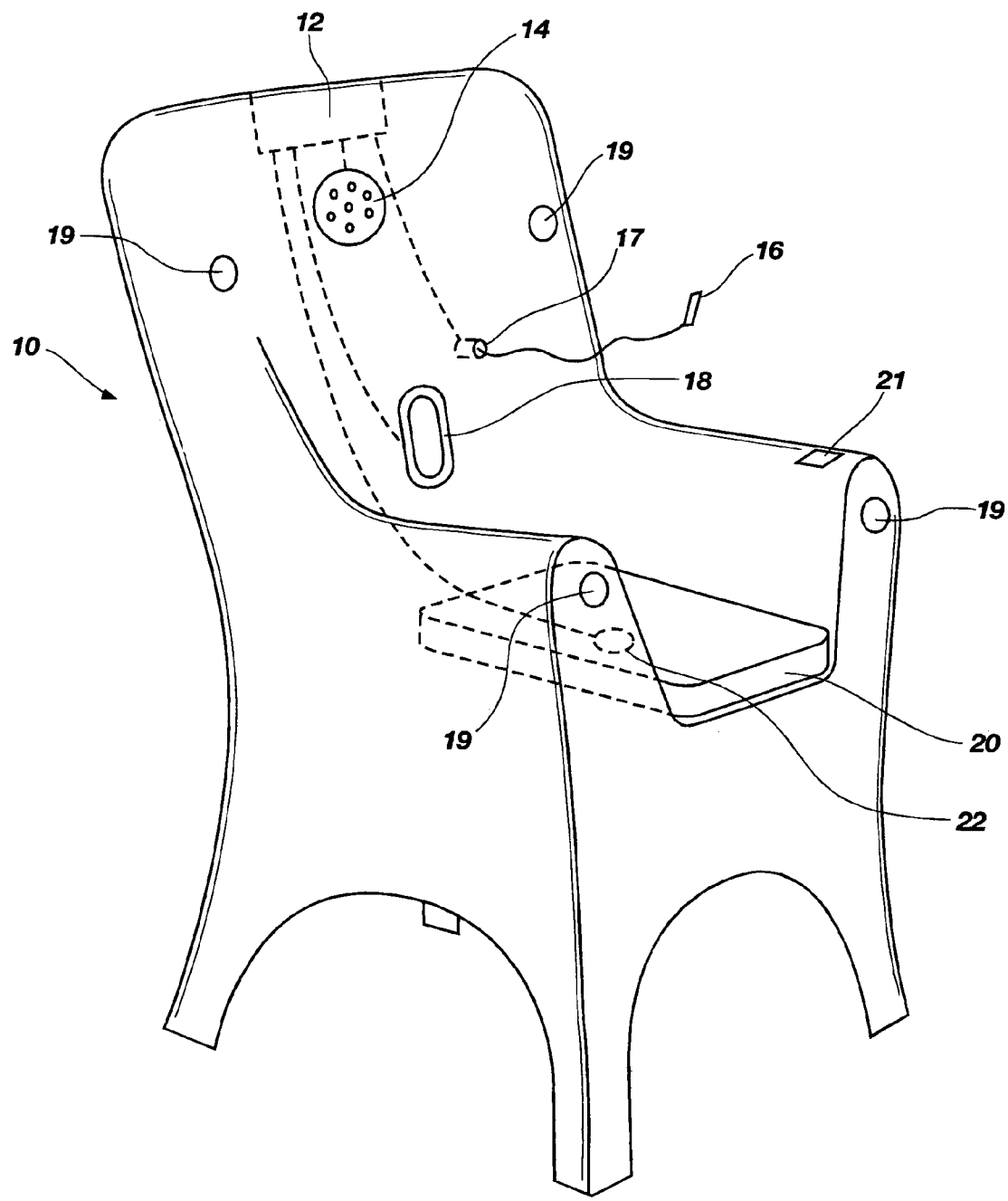
FIG. 1 shows a perspective view of a time-out chair according to the present invention, including several alternative sensors that can be used separately or together to detect that the child has left the time-out chair.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified mate- FIG. 1 shows a time-out chair 10 according to an illustrative embodiment of the present invention, which may be composed of plastic or other synthetic or natural materials suitable for making a chair. It will also be understood that the chair 10 may take any form that is appropriate for a child to sit on or in, such as a bench. Disposed in the chair 10 is a control box 12, which comprises a microcomputer. A speaker unit 14 is connected to the microcomputer in the control box 12. Also connected to the microcomputer is a sensor useful for detecting that the child has left the time-out chair 10. Three alternative exemplary embodiments of the sensor are shown in FIG. 1.

The first embodiment of the sensor comprises a tether 16, which can be attached to the child or the child's clothing. The tether 16 is coupled to a sensor 17, which detects forces pulling on the tether 16, and produces a signal when the child, in attempting to leave the time-out chair 10, pulls on the tether 16 and produces a force at the sensor 17. Such force sensors are well-known. The signal is transmitted to the microcomputer. Alternatively, a first magnet may be disposed on the end of an elastic tether that is attached to the child, such as by a clip, and a second magnet may be disposed on the chair-end of the tether, or adjacent thereto. When the child moves away from the chair, the clip detaches from the child and the first magnet snaps toward the second magnet due to the elastic tether. When the first magnet and the second magnet contact each other, an electrical circuit is completed, which results in a signal being produced.

The second exemplary embodiment is an infrared sensor 18, which detects the presence of a human body within a predetermined zone around the detector. Such detectors are well-known in other arts, such as those commonly used with self-flushing toilets or automatic doors. Such a sensor can be used to determine when the child is no longer within the zone of the detector. When the child leaves the zone of detection, a signal is generated by the infrared detector 18 and sent to the microcomputer, indicating that the child is attempting to leave the time-out chair 10.

The third exemplary embodiment is a seat 20 containing a force sensor 22 which detects the presence or absence of a threshold force on the seat 20. Such detectors are well known. The force sensor 22 detects when the child's weight is no longer on the chair 10, and generates a signal that is transmitted to the microcomputer and, thus, detects attempts to leave the chair 10.

It will be understood that these detectors are alternative means of detection, and that any of these detectors individually or together, or other detectors not disclosed here, may function in the present invention to detect when the child has attempted to leave the time-out chair. Each of these exemplary embodiments of the sensor produces a signal that is carried to the microcomputer. The microcomputer is configured to receive and interpret these signals to detect when the child has left the time-out seat 10. After the microcomputer has determined, by using the signal from the sensor, that the child is attempting to leave the chair, the microcomputer sends a predetermined audio signal stored in the memory of the microcomputer to the speaker unit 14, which produces an audio signal to warn the child to stay in the chair 10. The alarm may also comprise a visual signal, such as lights 19.

Figure 2:
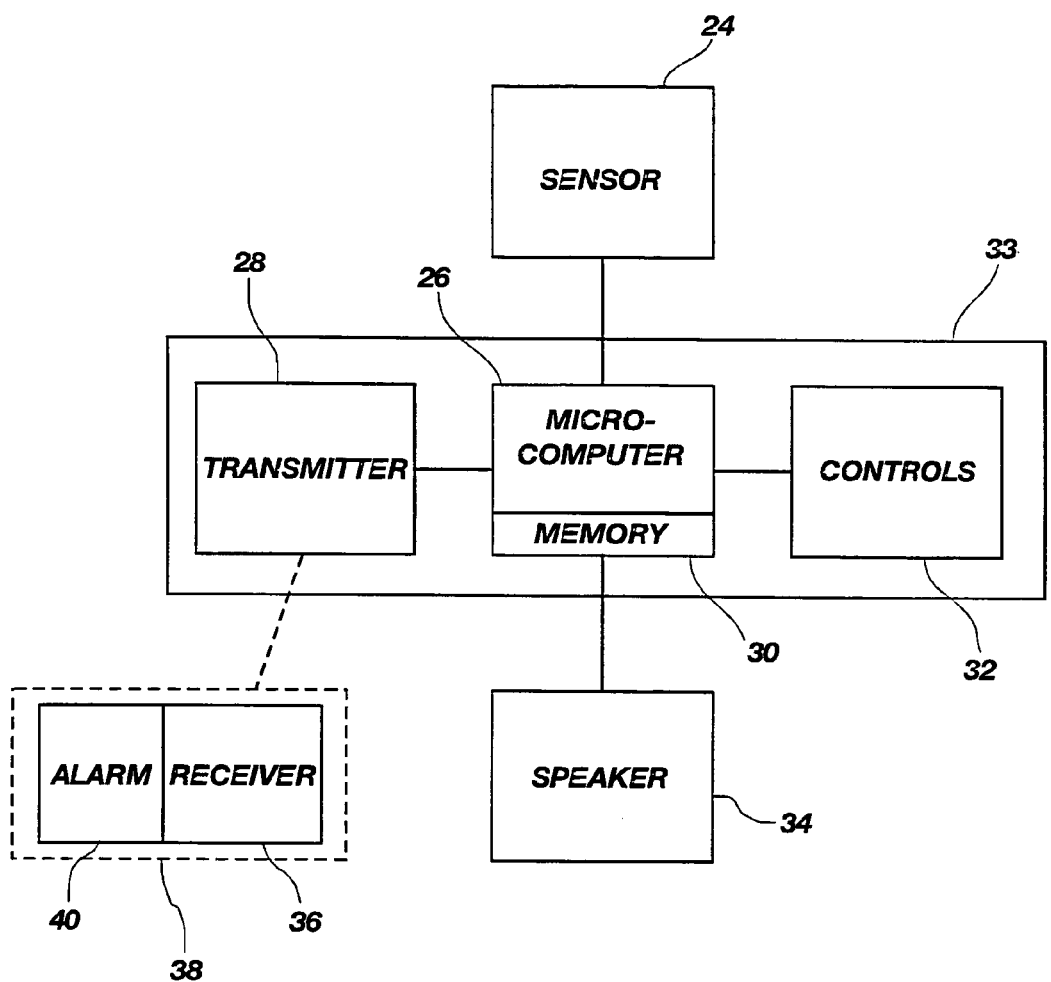
FIG. 2 shows a schematic diagram of connections between the several elements of the present invention.

FIG. 2 shows a schematic diagram of connections between the several elements of an illustrative embodiment of the present invention. A sensor 24 is connected to the microcomputer 26, which in turn is connected to a speaker 34. When the microcomputer 26 receives a signal from the sensor 24 that the child is attempting to leave the time-out chair, the microcomputer 26 sends a pre-recorded message stored in the microcomputer's memory 30 to the speaker 34, which warns the child to stay in the time-out chair. Also coupled to the microcomputer 26 are controls 32, illustrative embodiments of which are described in more detail below. Also coupled to the microcomputer 26 is a transmitter 28. The solid line 33 indicates that the microcomputer 26, transmitter 28, and controls 32 are disposed in a control box (ref. no. 12 in FIG. 1). Upon receiving a signal from the microcomputer 26 that the child has left the time-out chair, the transmitter 28 sends a signal to a remote device 38, which comprises a receiver 36 coupled to an alarm 40. The receiver 36 receives the signal and in turn sends a signal to the alarm 40 to generate an audio and/or visual alarm. This alarm 40 notifies caregivers that the child has left the time-out chair.

Figure 3:
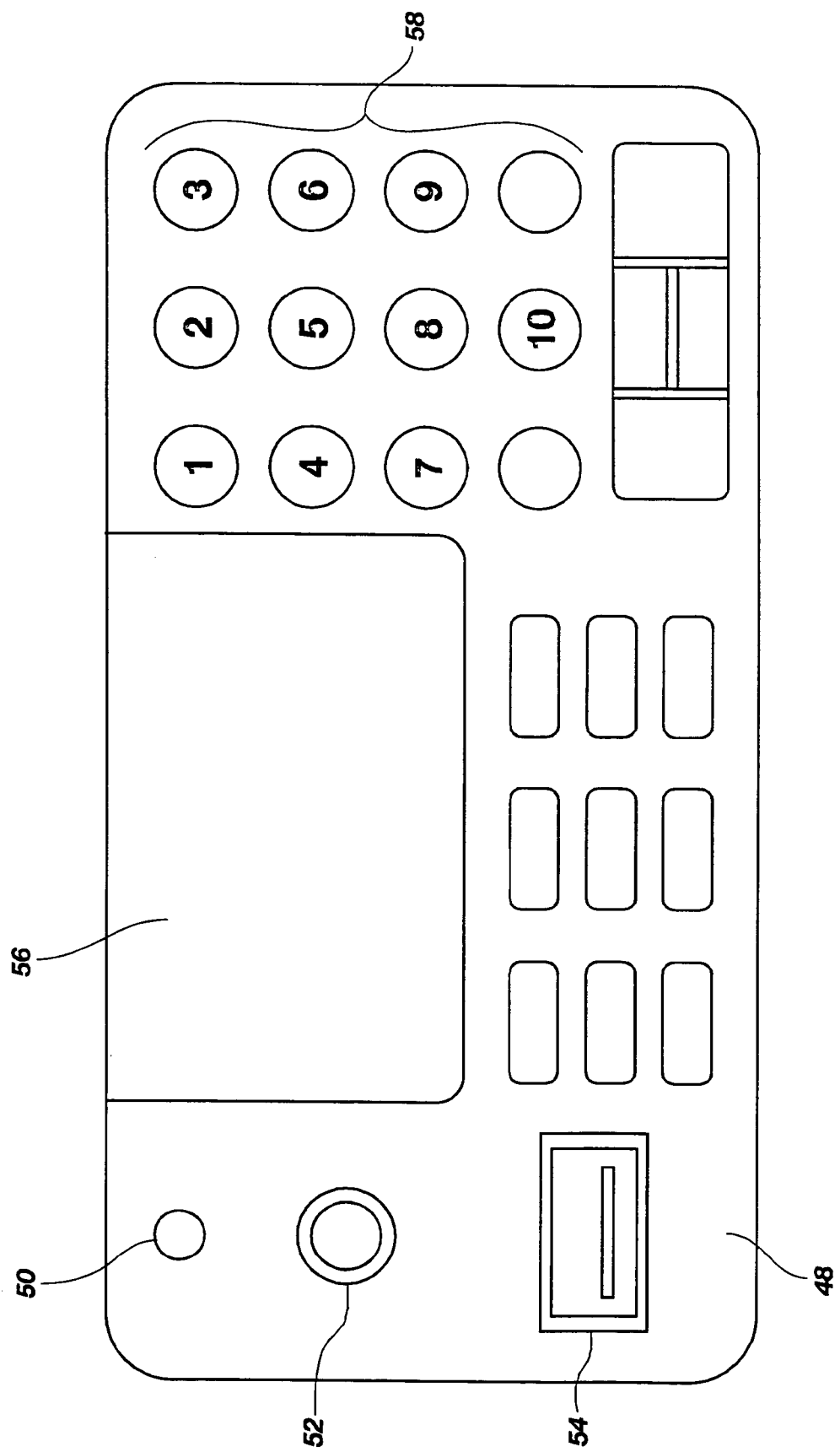
FIG. 3 shows a front elevation view of an illustrative control panel on the seat, which is used to set the time, select the signals to be used to notify that child has left the seat or that the time-out is over, and to control other aspects of the chair.

FIG. 3 shows a front view of an illustrative control panel 48 that may be used to set the length of time the child is to be in time-out, select the signals to be used to notify the caregiver that child has left the seat or that the time-out is over, and to control other aspects of the chair. The control panel 48 comprises a microphone 50, which is coupled to the microcomputer and can be used for recording a message to the child. Thus, audio signals stored in the memory of the microcomputer can be changed. These audio signals may be selected from several signals preinstalled in the memory, or a message may be recorded by the caregiver by using the microphone 50 on the control panel 48. A message may also be inputted to memory of the microcomputer using an analog input port such as ⅛ inch (3.2 mm) audio jack 52, or a digital input port, such as universal serial bus (USB) port 54, both on control panel 48. Any other port or device that can be used to input an audio signal can also be used. The microcomputer can store numerous audio signals. The signal that the caregiver chooses to play can then be selected from among the various signals stored on the microcomputer by using the control buttons 58 on the control panel 48. By selecting or recording an audio signal, the caregiver can use his or her knowledge of the child to produce or select a warning not to leave the time-out chair that is appropriate for the particular child and circumstances of the time-out. For example, the caregiver could select an audio signal previously recorded by the caregiver, such as "Billy, sit back down, your time-out isn't over!"

The microcomputer has a timing function. The caregiver can use the control panel 48 to set the appropriate time for the time out. When this time has finished, the microcomputer sends an audio signal to the speaker indicating that the time-out is over. This message can be recorded, inputted or selected, just as with the warning message described above. For example, the caregiver might select a message previously recorded by the caregiver, such as: "Thanks for staying in your time out. You can go play now, Billy!" Similarly, the caregiver could select a pre-installed musical message that would signal to the child the time-out is over.

In another exemplary embodiment, the microcomputer is capable of recording the number of times the child has attempted to leave the chair, and altering, as the caregiver directs, the time remaining or the message notifying that the time-out period is over. For example, using the control panel, the caregiver might indicate that for each attempt to leave the chair, an additional minute is to be added to the time-out period. Similarly, the caregiver could record a separate message that is to be played at the end of the time-out period if the child attempts to leave more than a specified number of times.

As shown in FIG. 3, the control panel 48 contains a display 56. This display 56 may be an LCD display or any other type of suitable display. This display 56 can show the names of the audio files stored in the memory, which produce the various audio signals. The control panel can be used to give names to or change the names of the audio files, and view the names of the various files. The display 56 may also be used to set the time for the time-out, and display the time remaining. There is also a display 21 disposed in the time-out seat 10 (FIG. 1) in such a way that the child can see the time remaining, and other information that the caregiver wants to display to the child. The display 21 may display the time remaining in the time-out with a standard numerical display, a graphical display representing the time, or any other method that may be useful and appropriate.

Figure 4:
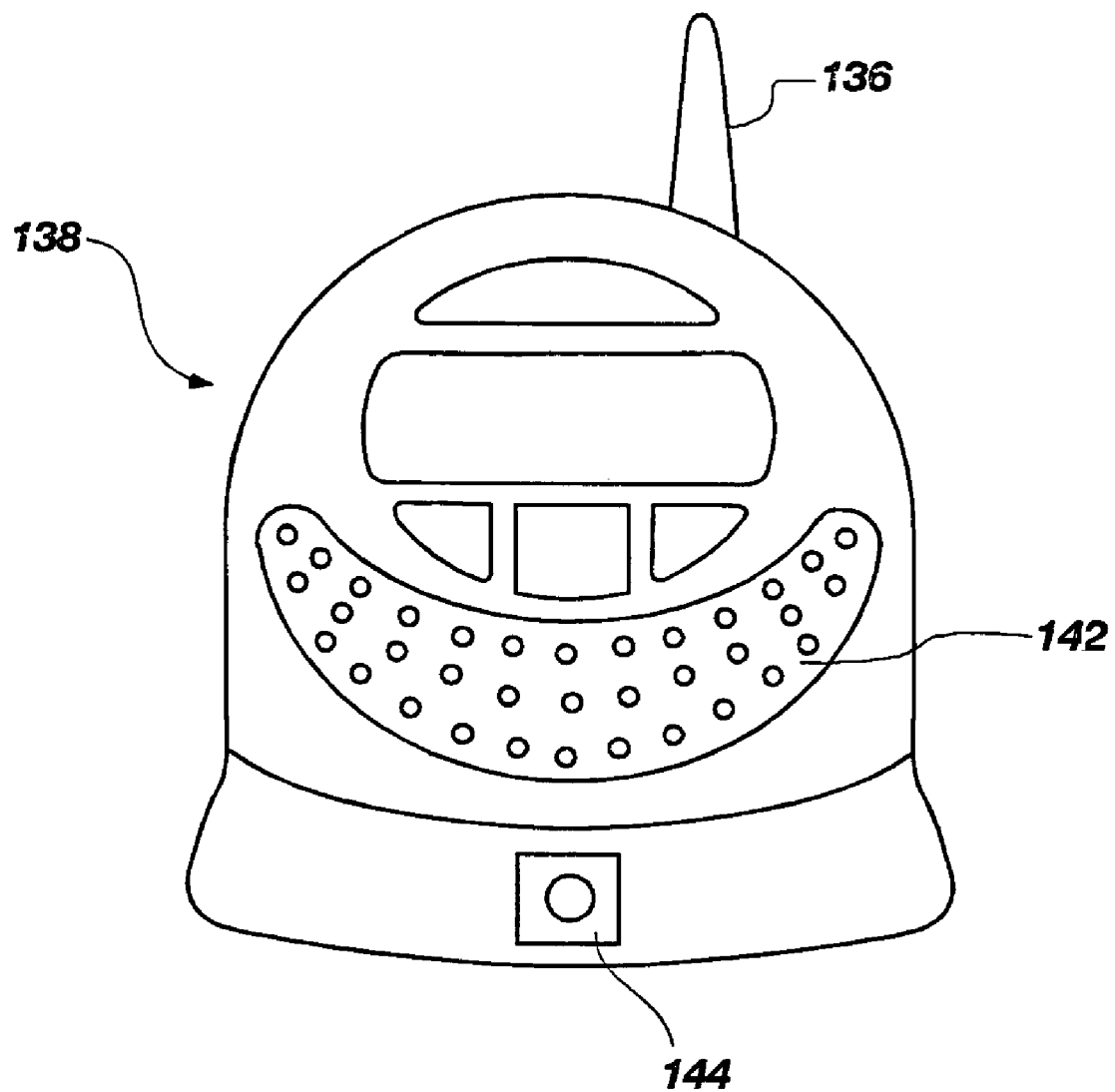
FIG. 4 shows a front elevation view of a remote device used to notify the caregiver that the child has left the chair.

As shown in FIG. 2, the control box 33 contains a transmitter 28. When the microcomputer 26 determines that the child is attempting to leave the time-out chair, it uses the transmitter 28 to transmit a signal to the remote unit 38, which contains a receiver 36. Referring now to FIG. 4, which shows a front elevation view of an illustrative remote unit according to the present invention, the remote unit 138 contains a receiver or antenna 136 for receiving the signal from the transmitter. Upon receiving the signal from the transmitter, the remote unit produces an audio and/or visual signal, which may be an audio alarm played by a speaker 142 and/or a visual alarm such as lights 144. This audio and/or visual signal alerts the caregiver that the child has left the time-out chair. The remote unit can be placed in another room of the house or other building, such that the caregiver does not need to be in visual contact with the child to monitor the time-out.

Figure 5:
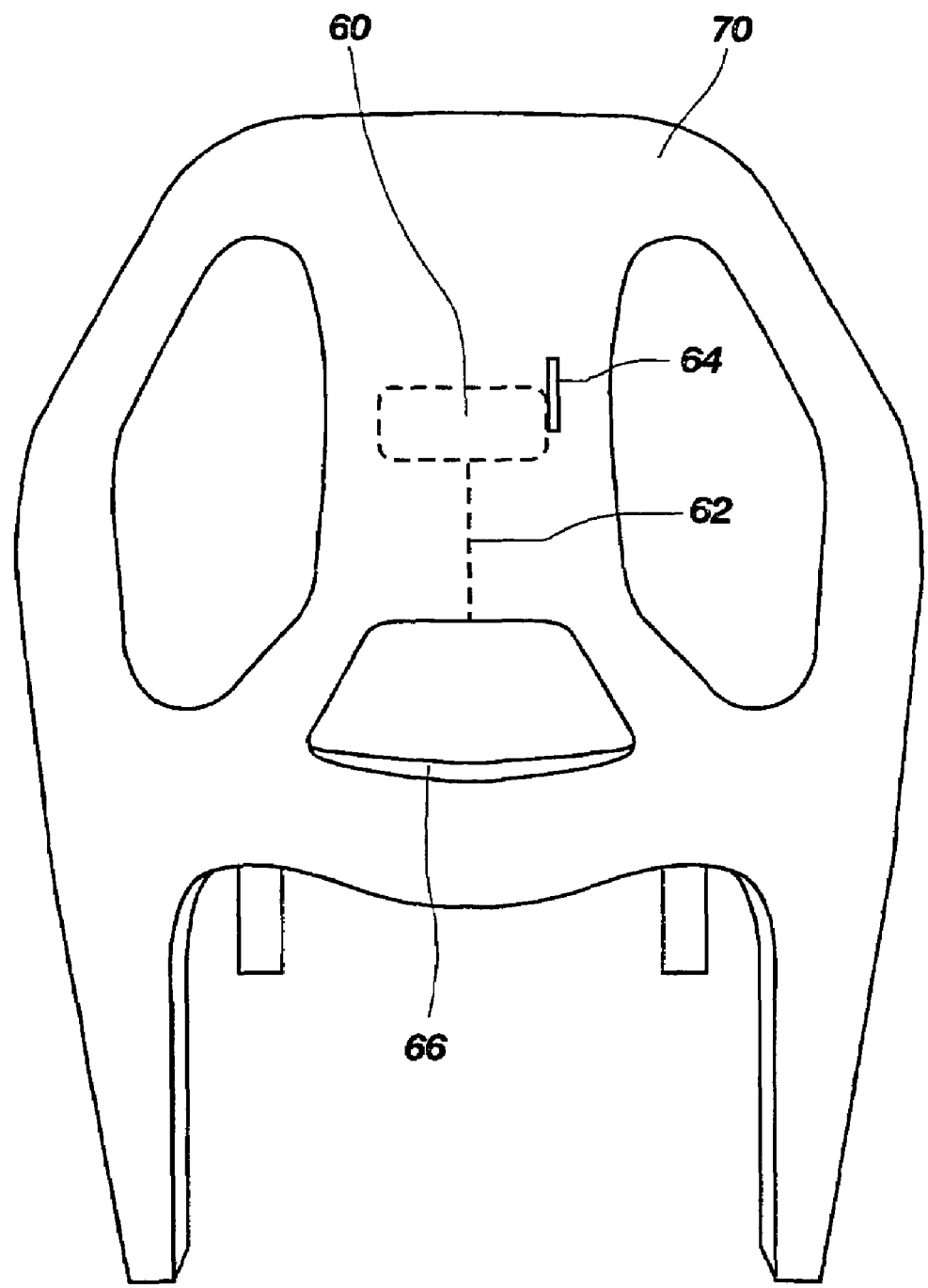
FIG. 5 shows a perspective view of another embodiment of the present invention.

As shown in FIG. 5, another exemplary embodiment of the present invention comprises a seat 70 with a detector 66, which is connected by a wire 62 to an audio device 60. The detector 66 may be chosen from among the infrared, tether, and force sensors described above, or any other device useful for detecting that the child has left the seat. The audio device 60 may be any device capable of playing a changeable audio signal; the illustrated example is a cassette tape recorder. The caregiver records, selects, or inputs the desired audio signal. When the caregiver desires to administer a time-out punishment, the child is seated in the time-out seat 70. If the child attempts to leave the seat 70, the detector sends a signal to the audio device 60. The signal turns on the audio device 60, which then emits the selected audio signal. The audio device 60 is positioned at a location on the chair where it is accessible to the caregiver, but not to the child. This embodiment may also incorporate features found in the previous embodiments, such a as transmitter 64, which sends a signal to a portable remote device (FIG. 4) that the caregivers can take with them. The remote device receives the signal from the transmitter 64 and emits an audio signal to warn the caregivers that child has left the time-out chair 70.

It should be understood that the invention is not limited by the embodiments described in the specification. Many variations and equivalents will be apparent to those skilled in the art which without departing from the spirit of the invention as defined in the claims.

The invention claimed is:

1. An apparatus for disciplining a child, comprising:
a chair configured for the child to sit on;
means for detecting disposed on the chair, wherein the means for detecting produces a signal when the child leaves the chair and wherein the means for detecting comprises a tether coupled to a force sensor; and
means for producing an alarm connected to the means for detecting, wherein the means for producing an alarm receives the signal and, upon receiving the signal, produces an alarm.

2. The apparatus of claim 1 wherein the means for producing an alarm comprises a speaker and a storage medium coupled to the speaker, wherein the storage medium is configured for storing audio files thereon, wherein the audio files each produce an audio alarm when played through the speaker.

3. The apparatus of claim 2 further comprising a microphone coupled to the storage medium wherein the microphone and the storage medium are configured for changing the audio files recorded on the storage medium.

4. The apparatus of claim 2 further comprising an analog audio port coupled to the storage medium wherein the analog audio port and storage medium are configured for changing the audio files recorded on the storage medium.

5. The apparatus of claim 2 further comprising a digital audio port coupled to the storage medium wherein the digital audio port and storage medium are configured for changing the audio files recorded on the storage medium.

6. The apparatus of claim 2 further comprising means for selecting among the audio files stored on the storage medium and playing a selected audio file upon receiving the signal.

7. The apparatus of claim 6 further comprising a display coupled to the storage medium wherein the display is configured for displaying a list of the audio files stored on the storage medium.

8. The apparatus of claim 1 further comprising a timer coupled to the means for producing an alarm, wherein the timer is configured for timing a selected period for disciplining the child.

9. The apparatus of claim 8 further comprising a second display for displaying an elapsed time or a time remaining in the selected period for discipline.

10. An apparatus for disciplining a child, comprising:
a seat configured for the child to sit on;
means for detecting disposed on the seat, wherein the means for detecting produces a first signal when the child leaves the seat and wherein the means for detecting comprises a tether coupled to a force sensor;
a transmitter coupled to the means for detecting, wherein the transmitter is configured for receiving the first signal and then transmitting a second signal; and
a remote unit comprising a receiver and an alarm member coupled to the receiver, wherein upon receiving the second signal the receiver signals the alarm member to produce an alarm, and the alarm member produces the alarm upon being signaled by the receiver.

11. The apparatus of claim 10 wherein the alarm is an audio alarm.

12. The apparatus of claim 10 wherein the alarm is a visual alarm.

13. An apparatus for disciplining a child, comprising:
a seat member configured for the child to sit on;
a sensor coupled to the seat member for detecting when the child is no longer sitting on the seat member and emitting a first signal, wherein the sensor comprises a tether coupled to a force sensor;
a microcomputer comprising a storage medium having at least one audio filed stored thereon and a speaker coupled to the storage medium, wherein the microcomputer is coupled to the sensor for receiving the first signal and playing a selected audio file stored on the storage medium through the speaker.

14. The apparatus of claim 13 further comprising a transmitter coupled to the microcomputer, wherein the microcomputer is configured for sending a second signal to the transmitter upon receiving the first signal from the sensor, and the transmitter is configured for transmitting the second signal.

15. The apparatus of claim 14 further comprising a remote unit configured for receiving the transmitted second signal and then producing an alarm.

16. The apparatus of claim 13 further comprising a microphone coupled to the microcomputer.

17. The apparatus of claim 13 further comprising an audio input port coupled to the microcomputer.

18. The apparatus of claim 13 further comprising a digital input port coupled to the microcomputer.

19. The apparatus of claim 13 further comprising a timer coupled to the microcomputer.

20. The apparatus of claim 13 further comprising a display coupled to the microcomputer.

* * * * *